Feb. 17, 1970  D. M. MacLEOD ET AL  3,496,062
WAX COMPOSITION FOR SEALING PAPER TO POLYETHYLENE FILM
Original Filed Feb. 3, 1964
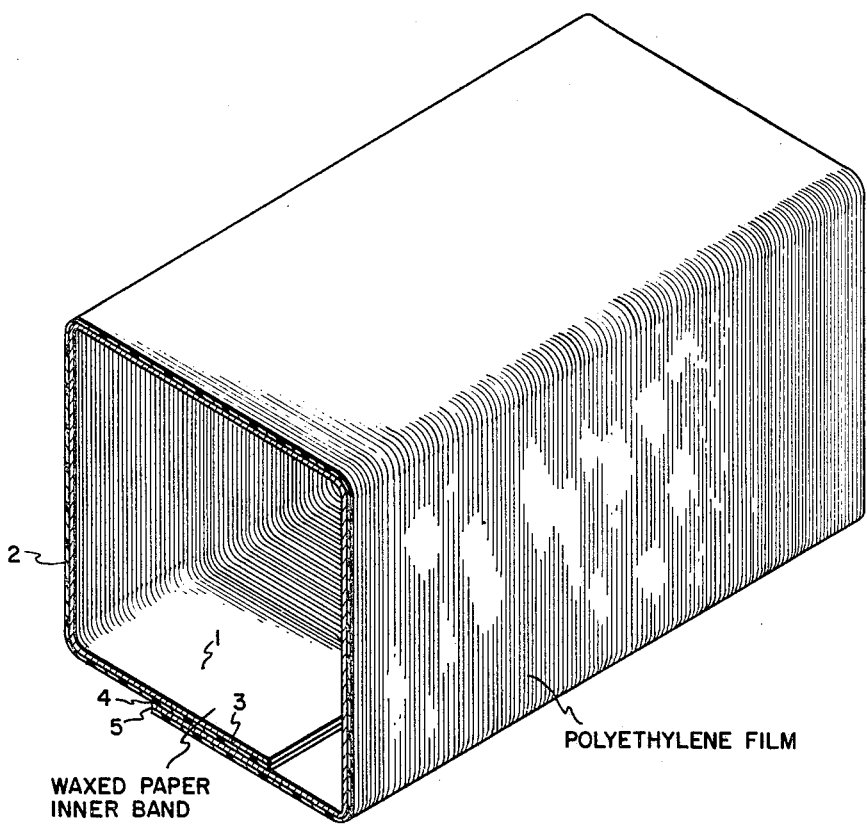
DAVID M. MACLEOD
STEPHAN ILNYCKYJ   INVENTORS
BY W. O. Heilman
PATENT ATTORNEY United States Patent Office 3,496,062
Patented Feb. 17, 1970

3,496,062
WAX COMPOSITION FOR SEALING PAPER TO POLYETHYLENE FILM
David M. MacLeod, Sarnia, Ontario, and Stephan Ilnyckyj, Islington, Ontario, Canada, assignors to Esso Research and Engineering Company, a corporation of Delaware
Original application Feb. 3, 1964, Ser. No. 341,922. Divided and this application Aug. 10, 1967, Ser. No. 659,598
Int. Cl. B32b 9/06, 27/30, 27/08
U.S. Cl. 161—235                                5 Claims

ABSTRACT OF THE DISCLOSURE

Laminates of paper and polyethylene films are sealed together with wax compositions comprising a paraffin wax in major amount blended with a minor amount of a microcrystalline wax and containing from about 5 to 30 wt. percent, based on the total weight of the wax composition, of a copolymer of ethylene and vinyl acetate, the copolymer having a molecular weight between about 1,000 and about 10,000.

---

This application is a division of application, Ser. No. 341,922 filed Feb. 3, 1964, now abandoned.

The present invention is broadly concerned with an improved wax composition by which paper can be effectively sealed to film, particularly polyethylene film. The wax composition of the present invention essentially comprises a paraffin type base wax containing a small amount of a microcrystalline wax to which has been added a particular copolymer of ethylene and vinyl acetate.

It is presently known in the art to utilize petroleum waxes as protective wrappings in combination with paper, fibrous materials and other supports. In the use of these waxes for these purposes, in order to provide the required protection, it is necessary to heat seal the edges of the wrapper. In this respect, paraffin wax has shown a great deficiency, specifically that the adhesive bond between the two pieces of waxed paper after sealing is weak and brittle. In order to overcome this, it is known in the art to modify a so-called paraffin wax by the addition of other waxes, such as microcrystalline waxes.

It is also known in the art to improve the paper seal by adding to the base wax, polymeric materials of high adhesiveness such as butyl rubber or high molecular weight ethylene-vinyl acetate copolymers. These high molecular weight copolymers are characterized by having molecular weights in the range above about 100,000 and higher, for having specific viscosities of 1.0 (1% in toluene) at 125° F. and a vinyl acetate content of about 30% and also by having melting points above about 250° F. In general, other than having exceedingly high viscosities, these blends containing about 20% of these high molecular weight ethylene-vinyl acetate copolymers are very effective coating materials and give strong paper-to-paper bonds.

However, blends of waxes containing these particular high molecular weight ethylene-vinyl acetate copolymers, although very effective in sealing paper to paper, are not suitable for sealing paper to polyethylene film as, for example, when waxed paper bands are used as inserts in wrapping bread with polyethylene film. The polyethylene film usually has a thickness of about 1 mil. Polyethylenes used for this application have a high molecular weight, a Melt Index usually of about 1.0, and are made by any one of the known processes, such as high pressure peroxide catalyzed processes, or by low pressure metal alkyl catalyzed processes.

By way of illustration and not limitation, FIGURE 1 illustrates schematically the principles of wrapping bread in a polyethylene film. For the sake of simplicity, not all the seals utilized are shown, but merely some to illustrate the technique of the present invention. The product is first wrapped with a wax paper 1 and then a polyethylene film 2. As illustrated, there exists a seal at 3 between the lower edge of paper 1 and the upper surface of polyethylene film 2. There is an additional seal at 4 between the upper edge of the paper 1 and the lower surface of polyethylene 2. An additional seal exists at 5 between the lower surface of the paper and the upper surface of the film.

As illustrated, the three seals are made ideally between paper and film. It is obvious from this drawing that all three seals are not of equal significance. It is seal 4 that is of vital importance for successful performance of the wrapping, as it and one of the other seals must be complete to effect a closed package. Seal 5 is next in importance, as it is the outermost, while seal 3 is of least significance.

In commercial practice if waxes alone are used, a bond between polyethylene film and paper is formed upon sealing, but is so weak that the package reopens on handling. There are certain additives such as butyl rubber or high molecular weight copolymers of ethylene and vinyl acetate which increase the strength of the bond to a satisfactory level, provided that sufficient heat is applied in the process of making the seal. Unfortunately a higher heat input is impossible as it melts the polyethylene film.

The insufficient sealing occurs because of very restricted conditions under which the seal between the polyethylene film and paper must be accomplished; namely, at a low temperature of about 150° F., a very low pressure of only the weight of the loaf of bread, and for a very short heating period. This is necessary to avoid melting of the polyethylene film which would cause holes in the film and render the wrapping nonprotective. This failure, under these conditions, may be the result of the high viscosity of these blends which results in poor heat transfer and poor penetration properties.

In accordance with the present invention, a particular ethylene-vinyl acetate copolymer is used in conjunction with a wax blend containing a small amount of microcrystalline wax. The ethylene-vinyl acetate copolymer is one such as described in U.S. Patent 3,093,623 issued June 11, 1963 entitled "Process for the Manufacture of Improved Pour Depressants for Middle Distillates;" Inventor: S. Ilnyckyj, and in U.S. Patent 3,048,479 issued Aug. 7, 1962 entitled "Ethylene-Vinyl Ester Pour Depressant for Middle Distillates;" Inventors: Stephan Ilnyckyj and Charles B. Rupar. This patent also describes the preferred method for the manufacture of this particular copolymer. In essence, the copolymer contains, besides ethylene, up to 50% by weight of an olefinically unsaturated aliphatic monomer containing from about 3 to 5 carbon atoms per molecule. In general, these compounds may comprise vinyl acetate, vinyl propionate, methyl methacrylate, allyl ethyl ether, acrylonitrile, vinylacetonitrile and the like.

The preferred copolymers comprise ethylene-vinyl acetate copolymer. It is preferred that the parts by weight of ethylene in the copolymer be in the range of from about 60 to 99% as compared to parts by weight of vinyl acetate in the range from about 40 to about 1%. A very desirable ethylene-vinyl acetate copolymer contains about 15 to 28% by weight of vinyl acetate as, for example, about 20 parts by weight of vinyl acetate.

The molecular weights of the ethylene-vinyl acetate copolymer are critical and should be in the range from about 1,000 to 10,000, preferably in the range from about 1,000 to 3,000. The molecular weights are determined by K. Rast's Method (Ber. 55, 1051, 3727 (1922)). It is to be understood that as the temperature of the reaction is increased, the molecular weight of the copolymer will also increase. Also, as the rate of the addition of the peroxide is lowered, the molecular weight of the copolymer will increase. Also, as the pressure is increased, the molecular weight of the copolymer will increase. Thus, the copolymer of the present invention, having the molecular weight specified, may be readily secured by operating within the ranges specified in the above-identified patents.

The base paraffin wax and the microcrystalline waxes are of the type described in U.S. Patent 3,098,598 issued July 23, 1963 entitled, "Dairy Wax Composition;" Inventors: Weisgerber et al.

In general, the crystalline or paraffin waxes produced from the paraffin distillates have melting points which range from about 120° F. to 150° F. The microcrystalline waxes are normally produced from residuums which boil above about 1,000° F., or from lube oil distillates which boil between 950–1,150° F., and have viscosities in the range from 150 to 200 S.U.S. at 210° F. These microcrystalline waxes are characterized by very minute crystalline forms and melt in the range from about 145° F. to 190° F.

Thus, it has been found that a wax composition consisting of a paraffin wax and a microcrystalline wax can be improved substantially with respect to its adhesive ability when employing in the wax composition from 1 to 50 wt. percent, preferably from about 15 to 25% by weight, of an ethylene-vinyl acetate copolymer. The ethylene-vinyl acetate copolymer would have a molecular weight in the range from about 1,000 to 10,000, preferably 1,000 to 3,000. It is also preferred that the amount of vinyl acetate in the copolymer be in the range from about 10 to 30% by weight, preferably in the range from about 15 to 20% by weight. In general, these copolymers should have a melting point in the range from about 150 to 200° F., preferably in the range from 160 to 175° F., and their specific viscosity in 1% solution in toluene at 125° F. ranging from 0.1 to 0.4.

It is preferred that the amount of paraffin wax present as compared to the microcrystalline wax present be in the range from about 60 to 98% by weight, preferably in the range from about 75 to 85% by weight. It is also preferred that the melting points of the paraffin wax fraction be in the range from about 130 to 160° F., preferably in the range from about 140 to 150° F. The preferred melting point of the wax blend is in the range from about 130 to 160° F., preferably from 140 to 150° F. The amount of copolymer present based upon the total wax present is in the range from 5 to 50% by weight, preferably in the range from 10 to 25% by weight as, for example, about 15% and 20% by weight.

The advantages of the present invention may be readily appreciated by the following example illustrating the same.

EXAMPLE

Wax blends were prepared and their ability to seal paper to paper and paper to polyethylene film determined. The base wax, consisting of 95% paraffin wax and 5% microwax, with no additives gave very weak bonds of 15 g./inch and 5 g./inch for the paper to paper and paper to polyethylene film, respectively.

The addition of high molecular weight ethylene-vinyl acetate copolymer above about 100,000 to this base wax had at 1% and 5% wt. concentration very little effect on the sealing strength for either of the two applications quoted above. The same copolymer at 15% concentration gave an excellent seal of 400 g./inch for paper to paper, but was still quite ineffective in sealing paper to polyethylene film giving a value of only 22 g./inch. It will also be noted that the viscosity of the blend containing 15% of high molecular weight ethylene-vinyl acetate copolymer was extremely high, 1,100 S.U.S. at 210° F.

The low molecular weight copolymer disclosed in this application at the same concentration gave sealing strength for paper to paper of 70 g./inch which, although a substantial improvement over the base wax, is still much inferior to the blend containing high molecular weight copolymer. In contrast, this blend of wax with 15% low molecular weight copolymer gave a distinctly superior performance to that of the base wax containing 15% high molecular weight copolymer when sealing paper to polyethylene. The value obtained was 80 g./inch. At the same time the viscosity of the blend remained low at 80 S.U.S. at 210° F.

In view of this small viscosity increase, it was possible to increase the concentration of low molecular weight copolymer in this blend to 20% which resulted in doubling of the paper to polyethylene sealing strength from 80 to 160 g./inch. Even then the viscosity of the blend amounted only to 130 S.U.S. at 210° F.

What is claimed is:

1. A laminate of paper and a polyethylene film sealed together with a wax compositon consisting essentially of between about 60 and about 98 wt. percent of a paraffin wax and from about 40 to about 2 wt. percent of a microcrystalline wax together with from about 5 to about 30 wt. percent, based on the total weight of the wax, of a copolymer of ethylene and vinyl acetate, said copolymer being characterized by having a molecular weight in the range from between about 1,000 and about 10,000.

2. A laminate of paper and a polyethylene film sealed together with a wax composition as in claim 1 wherein the amount of vinyl acetate present in said copolymer is in the range from between about 15 and about 28 wt. percent.

3. A laminate of paper and a polyethylene film sealed together with a wax composition of claim 2 wherein the molecular weight of said copolymer is in the range of between about 1,000 and about 3,000.

4. A laminate of paper and a polyethylene film sealed with the wax compositon of claim 1 wherein the amount of paraffin wax present is in the range from between about 75 and about 85 wt. percent and wherein the amount of microcrystalline wax is in the range of between about 25 and about 15 wt. percent.

5. A laminate of paper and a polyethylene film sealed together with the wax composition of claim 1 wherein the melting point of said paraffin wax is in the range of between about 120° and about 160° F. and the melting point of the microcrystalline wax is in the range of between about 145° and about 190° F.

References Cited

UNITED STATES PATENTS

| | | | |
|---|---|---|---|
| 2,877,196 | 3/1959 | Reding | 260—28.5 |
| 3,025,167 | 3/1962 | Butler | 260—235 |
| 3,048,553 | 8/1962 | Moss | 260—28.5 |
| 3,093,623 | 6/1963 | Ilnyckyj | 260—87.3 |
| 3,181,765 | 5/1965 | Bonzagni et al. | 161—235 X |
| 3,189,573 | 6/1965 | Oken. | |
| 3,205,186 | 9/1965 | Zaayenga. | |
| 3,245,930 | 4/1966 | McDowell et al. | 260—235 X |
| 3,297,610 | 1/1967 | Moyer. | |
| 3,303,082 | 2/1967 | Wilson | 161—235 X |
| 3,354,106 | 11/1967 | Ilnyckyj. | |

HAROLD ANSHER, Primary Examiner

C. B. COSBY, Assistant Examiner

U.S. Cl. X.R.

161—251, 252; 260—28.5